United States Patent

Bushnell et al.

[15] 3,641,569
[45] Feb. 8, 1972

[54] HIGHWAY VEHICLE SENSOR SYSTEM

[72] Inventors: David Bushnell, Framingham; Roger L. Fuller, Stow; Joseph J. Oliver, Allston, all of Mass.

[73] Assignee: Raytheon Company, Lexington, Mass.

[22] Filed: Oct. 1, 1970

[21] Appl. No.: 77,155

[52] U.S. Cl. .......................................... 340/38 L, 340/31 A
[51] Int. Cl. ................................................. G08g 1/015
[58] Field of Search .................................. 340/38 L, 31 A

[56] References Cited

UNITED STATES PATENTS 2,532,231  11/1950  Jarvis .................................. 340/38 L

FOREIGN PATENTS OR APPLICATIONS 938,376  12/1946  France ............................... 340/38 L Primary Examiner—William C. Cooper
Attorney—Milton D. Bartlett, Joseph D. Pannone, Herbert W. Arnold and David M. Warren

[57] ABSTRACT

A highway vehicle sensor, consisting of a main loop energized with low radiofrequency energy and having side legs spaced apart a predetermined distance, is buried in the surface of a highway. Around each side leg is a probe loop in which a signal is generated by the presence of a vehicle over the probe loop. The two output signals from the two probe loops are processed to determine vehicle presence, direction of travel, speed and length and headway between vehicles on the highway.

10 Claims, 6 Drawing Figures

PATENTED FEB 8 1972  3,641,569

INVENTORS
DAVID BUSHNELL
ROGER L. FULLER
JOSEPH J. OLIVER

INVENTORS
DAVID BUSHNELL
ROGER L. FULLER
JOSEPH J. OLIVER

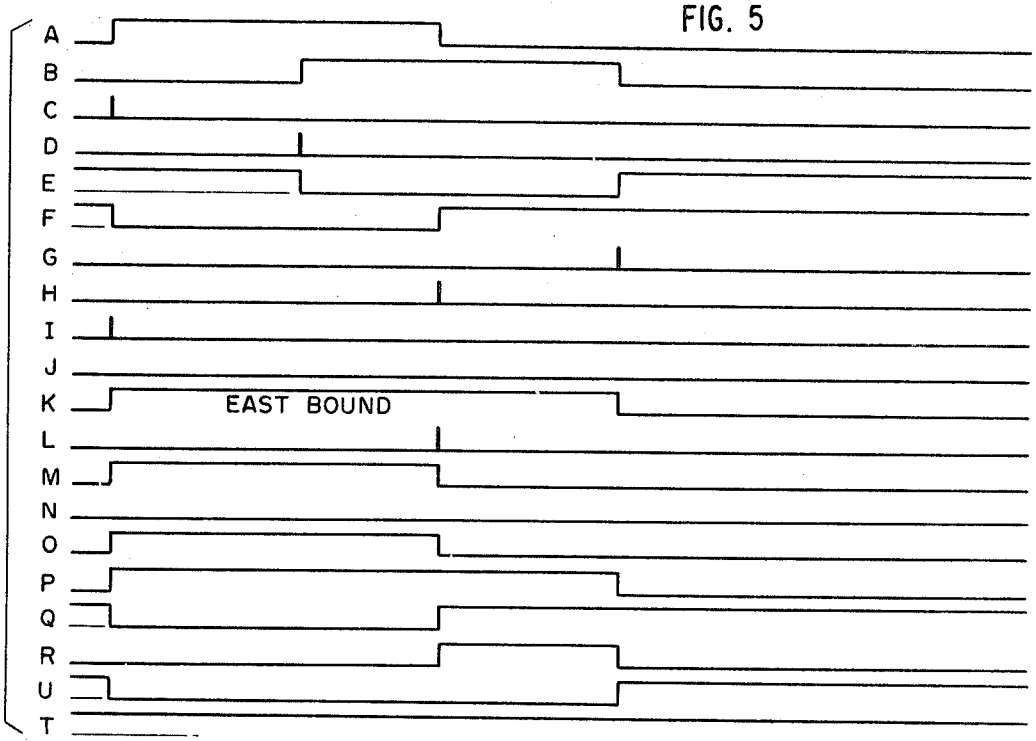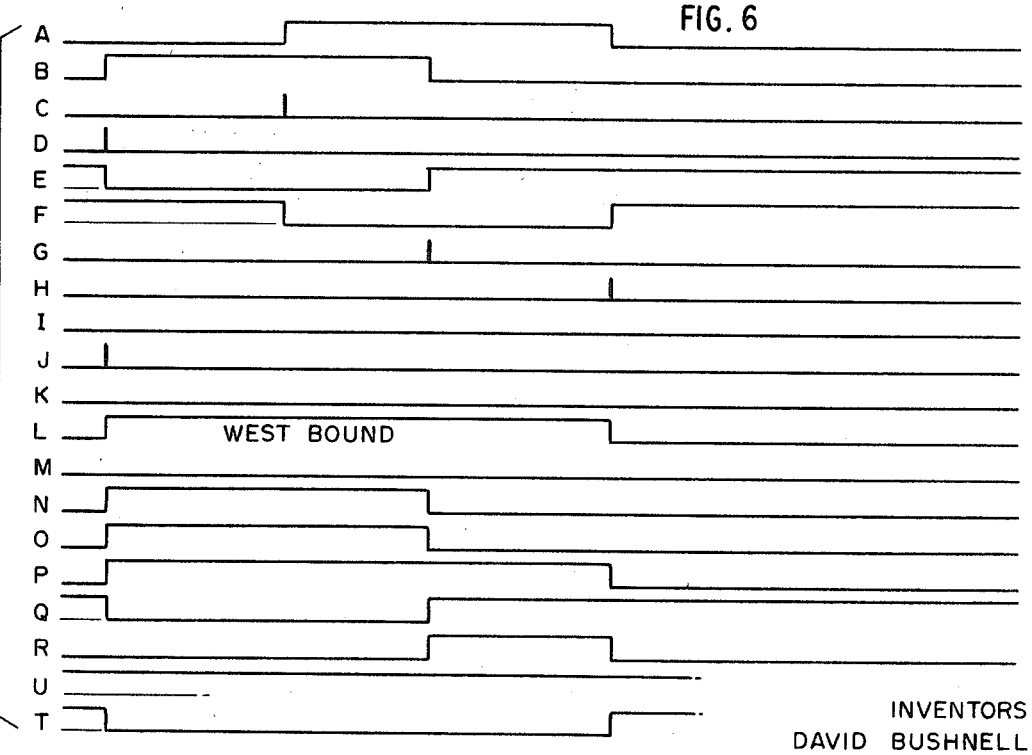

HIGHWAY VEHICLE SENSOR SYSTEM

BACKGROUND OF INVENTION

1. Field of the Invention
   Highway Vehicle Sensor System
2. Description of the Prior Art The prior art systems in the field of sensing vehicles travelling along a highway are based principally upon the use of inductive loop detectors buried in the highway. Such a loop can only sense the presence of a vehicle over the loop. If any information other than vehicle presence is desired, at least two such loops must be installed with a substantial distance between the loops. Such a system is expensive. Also, desirable information such as an accurate sensing of vehicle length and vehicle headway has not been readily available from such prior art systems.

SUMMARY OF THE INVENTION

In accordance with the teaching of the present invention, systems which are substantially simpler and less expensive than prior art systems are made possible while at the same time much more information as to vehicles travelling along a highway is readily and inexpensively achieved. This is accomplished by the use of a single main loop adapted to be buried across a highway with its side legs spaced along the highway. Around each side leg and closely spaced therefrom is a probe loop. The main loop is energized with low radiofrequency energy to produce a field about the probe loops and extending above the surface of the highway. A vehicle present over either leg of the main loop will produce a perturbation in the field which will generate a signal in the associated probe loop. The two signals from the probe loops are processed by a data processing system which measures the time duration of each of said signals, and the time interval between corresponding portions of said two signals. From these values and the distance between the two probe loops, the data processing system also can give additional information such as vehicle presence, its direction of travel, speed and vehicle length as well as the headway between vehicles passing over the sensor.

BRIEF DESCRIPTION OF THE DRAWINGS

In the annexed drawings:

FIG. 5 shows the voltage pulses as they occur at various points in the circuit of FIG. 4 for a car travelling in a given direction along a highway; and FIG. 6 shows such voltage pulses for a car travelling in the opposite direction along the highway.

DETAILED DESCRIPTION OF THE INVENTION

Figure 1:
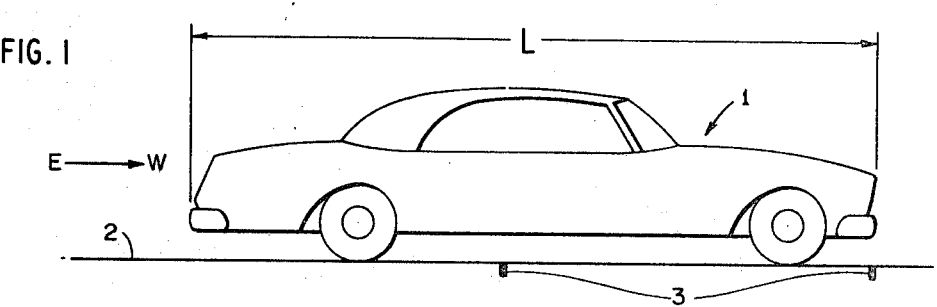
FIG. 1 is a diagram of a vehicle travelling along a highway in which a sensor according to this invention is embedded.

In FIG. 1 an automobile 1 is shown travelling on the surface 2 of a highway in a given direction which may be assumed to be a westerly direction. The problem which this invention solves is how to determine the presence, direction of motion, vehicle speed, vehicle headway and vehicle length in a single compact installation. By "vehicle headway" is meant the distance between the leading edge of one vehicle to the leading edge of the trailing vehicle, usually measured in seconds. This invention also permits measurement of vehicle headway in distance. For this purpose a novel sensor unit 3 is embedded in the surface of the highway to a slight depth which typically may be about 2 inches.

Figure 2:
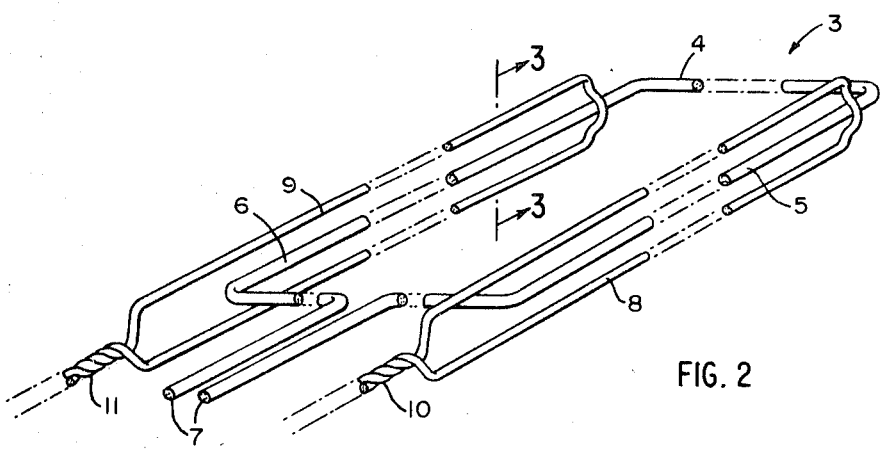
FIG. 2 is a perspective view of the construction of the sensor of FIG. 1.

As shown in FIG. 2, the sensor unit comprises a main loop 4 having straight side legs 5 and 6 which are placed in the highway transverse to the direction of travel of the vehicles to be detected. The two ends 7 of the loop 4 are adapted to be connected to a source of radiofrequency energy, as will be described below. Around legs 5 and 6 are placed probe loops 8 and 9 respectively. Each of the probe loops, in this embodiment, is shown disposed in a vertical plane through its corresponding leg 5 or 6. The ends of the loops 8 and 9 terminate in twisted pairs 10 and 11 to minimize absorption of radiofrequency energy except from the legs 5 and 6.

Figure 3:
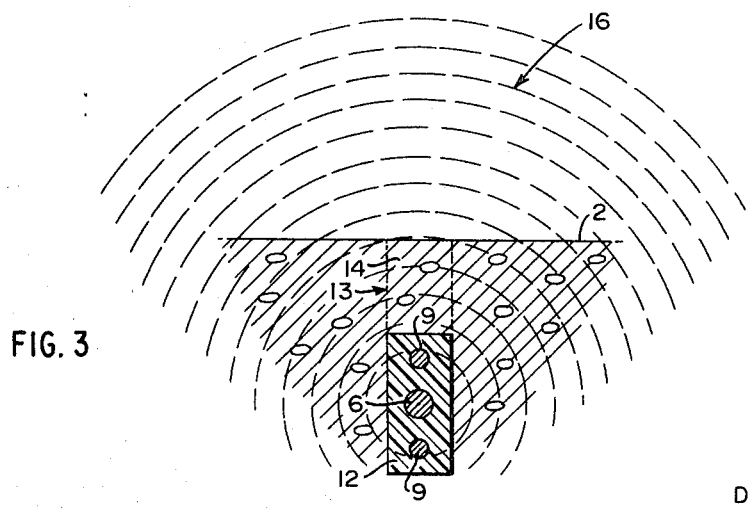
FIG. 3 is a cross section of one leg of the sensor of FIG. 2 showing it incapsulated and embedded in a highway.

The legs 5 and 6 and their associated probe loops 7 and 8 are preferably potted in a suitable potting material 12, illustrated in FIG. 3, and each buried in a trench 13 in the surface 2 of the highway, which, after the sensor has been buried to a depth of about 2 inches, is filled with paving material 14.

The legs 5 and 6 are of sufficient length to intercept the entire width of the highway on which it is desired to detect vehicles. The spacing between the legs 5 and 6 may be any convenient length. Typically such spacing is several feet, for example, 10 feet. The loops 8 and 9 are closely spaced from the legs 5 and 6, preferably less than an inch. In a typical case the sides of each probe loop were spaced ⅜ inch from its associated main loop leg, resulting in probe loops ¾ inch wide.

Figure 4:
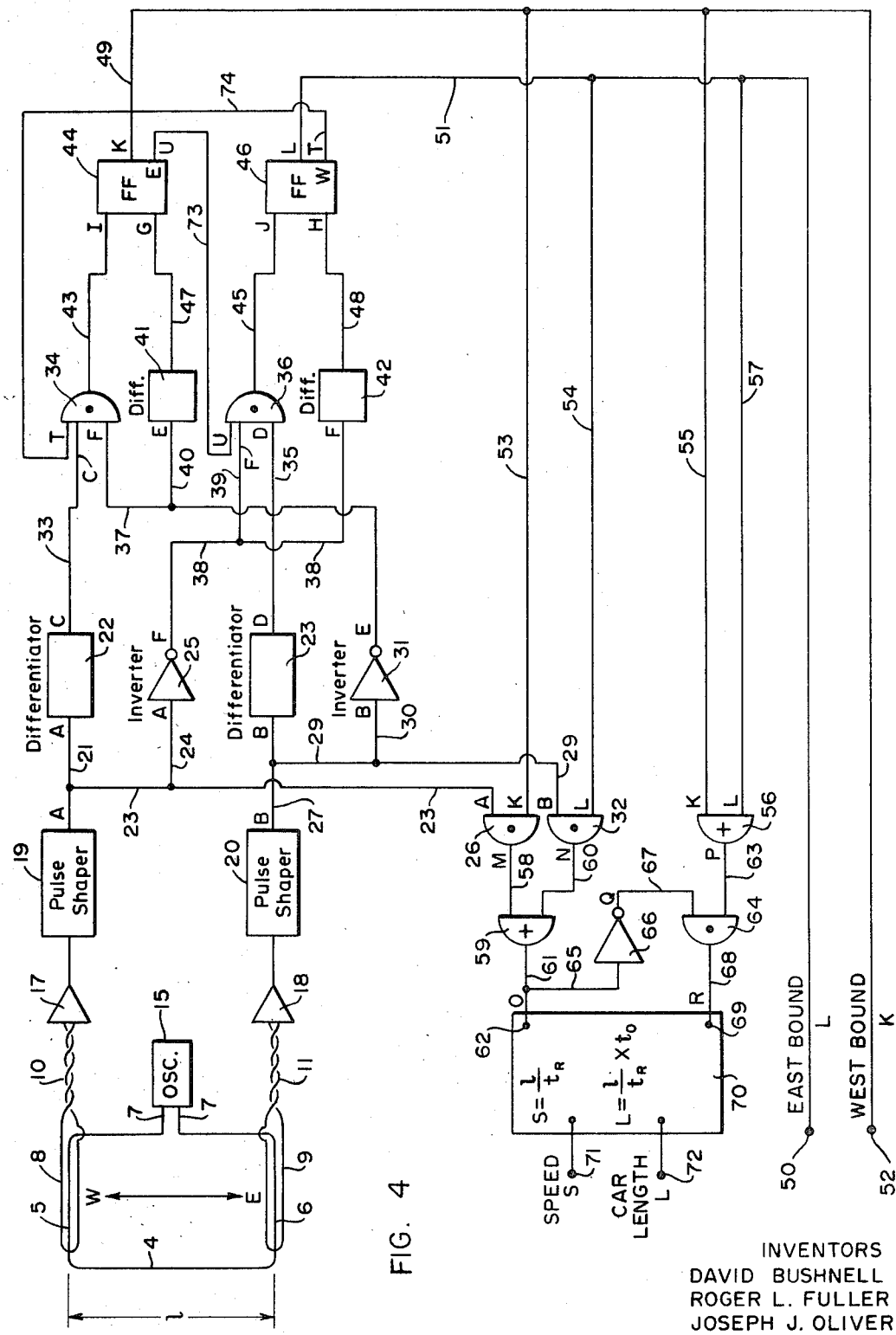
FIG. 4 is a block diagram of the circuit elements connected to the sensor of FIGS. 1–3.

As shown in FIG. 4, the ends 7 of loop 4 are connected to a source 15 of low radiofrequency energy, preferably about 100 kHz. When so energized, each leg 5 and 6 produces a field 16 (see FIG. 3) which extends above the surface 2, to be influenced by a vehicle, any part of which is located directly over the leg 5 or 6 generating such field. The probe loops 8 and 9 are for the purpose of sensing modifications in such fields. Each probe loop 8 and 9 is symmetrically positioned about its corresponding leg 5 or 6. In the absence of a vehicle, the field 16 around each leg is also substantially symmetrical so that substantially equal magnitudes of radiofrequency energy are detected by the opposite legs of each probe loop 8 and 9. However these magnitudes are of opposite direction or phase so that the resultant output of radiofrequency energy delivered to each tlisted pair 10 and 11 is substantially zero. The system to be described is preferably so adjusted that it does not respond to any residual values of radiofrequency energy appearing at twisted pairs 10 and 11 in absence of a vehicle over legs 5 or 6. When, however, a vehicle does appear over leg 5 or 6, the local configuration of field 16 is changed so that it is no longer symmetrical with respect to the legs of the associated probe loop thereby generating an output signal at the twisted pair output from such probe loop. Thus the signal output from each probe loop is a pulse of the low radiofrequency carrier equivalent to the time the vehicle is over such probe loop.

As shown in FIG. 4, the signal outputs from the twisted pairs 10 and 11 are fed to amplifiers 17 and 18, the outputs of which are supplied to pulse shaper circuits 19 and 20 of any well-known type which detect the radiofrequency energy and deliver a substantially rectangular direct voltage pulse of the envelope of the radiofrequency input pulse. The output of pulse shaper 19 is supplied through connection 21 to a differentiator 22 of any well-known type which supplies an output short pulse in response to the upward going portion of the output of pulse shaper 19 but which ignores the downward going portion of such output. The output of pulse shaper 19 is also supplied through connections 23 and 24 to an inverter 25 of any well-known type which inverts the output of pulse shaper 19. In addition, the output of pulse shaper 19 is supplied through connection 23 to one input to an AND-gate 26. In the same way as described for pulse shaper 19, the output of pulse shaper 20 is fed by connection 27 to differentiator 28, by connections 27, 29 and 30 to inverter 31 and by connections 27 and 29 to one input to AND-gate 32.

The output of differentiator 22 is supplied by connection 33 to one input to AND-gate 34; while the output of differentiator 28 is supplied through connection 35 to one input to AND-gate 36. The output of inverter 31 is supplied by connection 37 to a second input to AND-gate 34 while the output of inverter 25 is supplied by connections 38 and 39 to a second input to AND-gate 36. In addition, the output of inverter 31 is supplied through connections 37 and 40 to differentiator 41 of the type described for differentiator 22, and the output of inverter 25 is supplied through connection 38 to a similar differentiator 42. Each gate 34 and 36 is supplied with a third input derived respectively from connections 74 and 73 as will be described below.

Whenever a pulse occurs on connections 33, 37 and 74, AND-gate 34 opens and supplies an output through connection 43 to set flip-flop 44. Likewise whenever a pulse occurs in connections 39, 35 and 73, AND-gate 36 opens and supplies an output through connection 45 to set flip-flop 46. The output of differentiator 41 is supplied through connection 47 to reset flip-flop 43, while the output of differentiator 42 is supplied through connection 48 to reset flip-flop 46. The set output of flip-flop 44 is supplied through a connection 49 to a terminal 52. With the orientation of the loop 4 as shown in FIG. 4 and in accordance with the operation of the system as will be explained below, a signal indicative of the presence of a westbound vehicle will appear at terminal 52. Likewise, the set output of flip-flop 46 is supplied through a connection 51 to a terminal 50 at which a signal indicative of an eastbound vehicle will appear.

The set output of flip-flop 44 is also supplied through connections 49 and 53 to the second input to AND-gate 26, and the set output of flip-flop 46 is also supplied through connections 51 and 54 to the second input to AND-gate 32. The reset output of flip-flop 44 is supplied through connection 73 to the third input to AND-gate 36 and the reset output of flip-flop 46 is supplied through connection 74 to the third input to AND-gate 34. In addition, the set output of flip-flop 44 is supplied through connections 49 and 55 to one input to OR-gate 56 and the set output of flip-flop 46 is supplied through connections 51 and 57 to the second input to OR-gate 56. The output of AND-gate 26 is supplied through connection 58 to one input to OR-gate 59, while the output of AND-gate 32 is supplied through connection 60 to the second input to OR-gate 59. The output of OR-gate 59 is supplied through connection 61 to a terminal 62 at which, as will be explained below, a signal indicative of the time the vehicle is over one of the probe loops will appear.

The output of OR-gate 56 is supplied through connection 63 to one input to AND-gate 64. The output of OR-gate 59 is also supplied by connections 61 and 65 to inverter 66, the output of which is supplied through connection 67 to the second input to AND-gate 64. The output of AND-gate 64 is supplied by connection 68 to a terminal 69 at which, as will be explained below, a signal indication of the time it takes a point on the vehicle to cross the loop 4 will appear.

The signals at terminals 62 and 69 may readily be converted to indicate the speed of the vehicle and its length. This may be done by feeding such signals to any well-known type of computer 70 which will perform the required computations, as will be described below, to deliver to its terminals 71 and 72 signals indicative of the speed of the vehicle and its length.

The operation of the system shown in FIG. 4 will best be understood by referring to FIG. 5 in which the form of signal appearing at the points indicated at A through R, T and U in FIG. 4 are indicated by corresponding letters in FIG. 5. It will be understood that the horizontal direction in FIG. 5 represents time, and the vertical displacement of each curve indicates a signal level of "1" following an upward displacement and a signal level of "0" a downward displacement. If it is assumed that the loop 4 is oriented as shown in FIG. 4, FIG. 5 represents the operation in the presence of an eastbound vehicle. As the front of the vehicle appears over probe loop 8, the signal at A moves from a "0" to a "1" level and remains at the "1" level until the rear of the vehicle passes beyond probe loop 8 whereupon the signal at A drops to the "0" level. At some time following the former event, the front of the vehicle will appear over probe loop 9 and the signal at B moves from a "0" to a "1" level. The signal at B remains at that level until the rear of the vehicle passes beyond probe loop 9 whereupon the signal at B drops to the "0" level. The two signals A and B contain within them all the information which this invention is designed to obtain and may be readily processed to display such information.

The differentiator 22 produces a single "1" impulse at C to coincide with the upward going portion of the signal at A and the differentiator 28 produces a single "1" impulse at D to coincide with the upward going portion of the signal at B. The inverter 31 produces, at E, an inversion of the signal at B so that when the B signal goes to the "1" level the signal at E goes to the "0" level and when the signal at B goes to the "0" level the signal at E goes to the "1" level. Similarly, because of inverter 25, the signal at F is the inverse of the signal at A. The differentiator 41 produces a single "1" impulse at G to coincide with the upward going portion of the signal at E, and the differentiator 42 produces a single "1" impulse at H to coincide with the upward going portion of the signal at F.

The level at T during the conditions represented in FIG. 5 remains at a "1" level since the flip-flop 46 remains in its reset condition, as will be explained below. However, the signal level at U, as will be explained below, drops from a "1" level at the time of the "1" level at C and remains at such level until the time of the "1" level at G, when it returns to the "1" level. When the "1" level signal is present simultaneously at both C, E and T, the gate 34 opens and delivers a "1" pulse at I. As is illustrated in FIG. 5, this occurs at the beginning of the "1" signal at A. Under the conditions specified there is no coincidence of a "1" signal at F, D and U and therefore, in FIG. 5 the signal at J remains at a "0" level. The "1" signal at I sets flip-flop 44 so that a "1" level signal appears at K and persists until the signal at G resets flip-flop 44. However, under these conditions, there is no J signal to set flip-flop 46 and so the signal at L remains at the "0" level. Therefore flip-flop 46 remains in its reset conditions and for this reason the signal at T remains at the "1" level as set forth above. The signal at K which is supplied to terminal 52 indicates the presence of an eastbound vehicle. This fact may be displayed in any desired manner. Thus it will be seen that an initial A output will produce an eastbound signal, while an initial B output will produce a westbound signal.

Since the gate 26 opens upon the occurrence of a "1" signal at both A and K, a "1" level signal will appear at M which coincides in time with the "1" level signal at A. Since there is no coincidence between the "1" signals at B and L, the gate 32 remains closed and the signal level at N remains at "0". The signal at M opens gate 59 and produces a "1" level signal at O which has the same time duration as at M and A. Thus the signal at O gives the time it takes for the vehicle to pass completely over the probe loop 8. The signal level at P goes to a "1" level when the gate 56 is opened by the signal at K so that the "1" signal at P coincides in time with the signal at K. The signal at Q is the inverse of the signal at O because of the action of inverter 66. A "1" level signal appears at R only during the coincidence of a "1" signal at Q and P. It will be noted that the time duration of R is the difference between the total time the vehicle is over probe loops 8 or 9 and the time it is over 8 alone and thus represents the time it takes a point on the vehicle to cross between the probe loops 8 and 9. In this case that point is the rear of the vehicle.

If the time it takes the vehicle to cross the probe-loop 8 is represented as $t_o$; the time it takes a point on the vehicle to cross from probe loop 8 to probe loop 9 is represented as $t_R$, the distance between loops 8 and 9 is represented as $l$, the speed of the vehicle is represented as $S$ and the length of the vehicle is represented as $L$, then it can be shown that (Eq. 1) $\quad S = l/t_R$; and
(Eq. 2) $\quad L = l/t_R \times t_o$ Such computation is readily carried out by any well-known computer 70 so that signals representing speed and length of vehicle appear at terminals 71 and 72 respectively. The value of these signals may be displayed or utilized in any desired manner.

The showing in FIG. 6 represents a vehicle of the same length and travelling at the same speed as in FIG. 6 except that the vehicle is westbound. The same analysis applied to FIG. 6 as applied to FIG. 5 shows that the output signals remain the same except that the presence signal appears at L instead of at K, thus indicating by the signal at terminal 50 that the vehicle is westbound.

It will be apparent that, for consecutive vehicles travelling in the same direction, the above system will also indicate the time interval between the signals for the two vehicles. It will be apparent to persons skilled in the art that the headway between consecutive vehicles may be readily derived from such information.

Various modifications of the embodiment described above may be made. For example, although the probe loops 8 and 9 are shown disposed in a vertical plane through legs 5 and 6 of loop 4, other orientations of the probe loops are possible. However, the vertical orientation will tend to give maximum response to vehicle presence. It is also clear that the principles of the invention are useful in systems which generate any one or more of the items of information which are described above, as well as in systems which process the signals from the probe loops to deliver additional information.

From the above it will be seen that this invention provides, in a simple and reliable installation at a single location on a highway, a great deal of accurate information about vehicles travelling along the highway including the presence, number, speed, length, direction of travel and headway of such vehicles. The term "highway" as used herein is not intended to be limited to roads carrying automobile traffic since this invention is also applicable to railways, airport taxiing ramps and the like. Thus the term highway is intended to include any ground surface which is adapted to carry moving vehicles.

What is claimed is:

1. A highway vehicle sensor comprising
   a. a field generating element having two extended legs adapted to be spaced along a highway;
   b. means for energizing said main element to produce a field around each leg of a magnitude to project above the surface of such highway; and
   c. a probe located closely adjacent each of said legs, each such probe being adapted to generate a signal upon a variation in the field of its adjacent side leg produced by the presence of a vehicle in the immediate proximity of said leg.

2. A sensor as in claim 1 in which said energizing means comprises a source of radiofrequency energy.

3. A sensor as in claim 1 in which said field-generating element comprises a loop.

4. A sensor as in claim 1 in which each probe comprises a loop about the adjacent leg of said field-generating element.

5. A highway vehicle sensor system comprising
   a. a pair of sensor elements spaced along a highway;
   b. means for producing a field adjacent to each sensor element and projecting above the highway in the path of vehicles to be sensed;
   c. each sensor element being adapted to generate a signal in response to a change in said field produced by the presence of a vehicle in said field; and
   d. means for measuring the time interval between corresponding predetermined portions of said two signals.

6. A system as in claim 5 in which are provided
   a. means for determining the order in which said two signals are produced by the passage of a vehicle; and
   b. means for deriving from said order an indication of the direction of travel of said vehicle along said highway.

7. A system as in claim 5 in which means are provided for determining the speed of a vehicle travelling along said highway; said latter means comprising data processing means for dividing the distance between said sensors by said time interval whereby the output of said data processing means represents said speed.

8. A system as in claim 7 in which means are provided for determining the length of said vehicle, said latter means comprising
   a. means for measuring the time duration of one of said two signals; and
   b. data processing means for multiplying said time duration by the speed of said vehicle as determined in claim 7, whereby the output of said latter data processing means represents said length.

9. A system as in claim 5 in which the means for producing said field comprises a field-generating element having two extended legs spaced along said highway and said sensor elements are respectively located adjacent to said legs.

10. A system as in claim 9 in which the source of radiofrequency energy is connected to said field-generating element for generating said field.

* * * * *